US005741468A

United States Patent [19]
Saito et al.

[11] Patent Number: 5,741,468
[45] Date of Patent: Apr. 21, 1998

[54] EXHAUST GAS CLEANER AND METHOD FOR CLEANING EXHAUST GAS

[75] Inventors: Mika Saito; Kiyohide Yoshida; Naoko Irite; Hong He; Akira Abe; Akira Nishiya, all of Kumagaya, Japan

[73] Assignee: Kabushiki Kaisha Riken, Tokyo, Japan

[21] Appl. No.: 466,436

[22] Filed: Jun. 6, 1995

[30] Foreign Application Priority Data

| Dec. 28, 1994 | [JP] | Japan | 6-339944 |
| Feb. 23, 1995 | [JP] | Japan | 7-059812 |
| Feb. 24, 1995 | [JP] | Japan | 7-061950 |
| Feb. 28, 1995 | [JP] | Japan | 7-065173 |
| Apr. 5, 1995  | [JP] | Japan | 7-104821 |

[51] Int. Cl.$^6$ ............... B01J 8/00; C01B 21/00
[52] U.S. Cl. ............ 423/239.1; 422/171; 422/172; 422/177; 423/213.2; 423/213.5; 423/239.2; 502/330; 502/347
[58] Field of Search .......... 422/177, 171, 422/172; 423/213.2, 213.5, 239.1, 239.2, 213.7; 502/326, 330, 331, 337, 347, 353, 515; 60/300, 301, 302

[56] References Cited

U.S. PATENT DOCUMENTS

| 3,857,921 | 12/1974 | Tamura et al. | 423/213.5 |
| 3,953,576 | 4/1976  | Meguerian et al. | 422/171 |
| 4,621,071 | 11/1986 | Blanchard et al. | 502/302 |
| 5,354,544 | 10/1994 | Logan et al. | 423/213.7 |

FOREIGN PATENT DOCUMENTS

| 0577438    | 7/1993  | European Pat. Off. . |
| 0605251    | 12/1993 | European Pat. Off. . |
| 0628706    | 6/1994  | European Pat. Off. . |
| 2440433    | 8/1974  | Germany . |
| 63-100919  | 5/1988  | Japan . |
| 63-283727  | 11/1988 | Japan . |
| 1-130735   | 5/1989  | Japan . |
| 4-354536   | 12/1992 | Japan . |
| 2248194    | 9/1991  | United Kingdom . |

*Primary Examiner*—Krisanne Thornton
*Attorney, Agent, or Firm*—Browdy and Neimark

[57] ABSTRACT

An exhaust gas cleaner is constituted by a first catalyst carrying an Ag component, a second catalyst carrying an Ni component or two or more of an Ni component, Ag component and Cu component, and optionally a third catalyst carrying a noble metal component alone or in combination with a base metal component. The second and third catalysts may be physically mixed to form a mixed catalyst. Another exhaust gas cleaner is constituted by a mixed catalyst of a first catalyst carrying an Ag component and a second catalyst carrying an Ni component alone or in combination with a Cu component, and a third catalyst carrying a noble metal component alone or in combination with a base metal component. Still another exhaust gas cleaner is constituted by a first catalyst carrying an Ag component, a second catalyst which is a mixture of an Ni catalyst, Ag catalyst and Cu catalyst, and optionally a third catalyst carrying a noble metal component alone or in combination with a base metal component. The second and third catalyst may be physically mixed to form a mixed catalyst.

41 Claims, No Drawings

EXHAUST GAS CLEANER AND METHOD FOR CLEANING EXHAUST GAS

BACKGROUND OF THE INVENTION

The present invention relates to an exhaust gas cleaner for effectively removing nitrogen oxides by reduction from an exhaust gas containing nitrogen oxides and an excess amount of oxygen, and a method for cleaning an exhaust gas with such an exhaust gas cleaner.

Various exhaust gases discharged from internal combustion engines such as automobile engines, etc., combustion apparatuses installed in factories, home fun heaters, etc. contain nitrogen oxides such as nitrogen monoxide and nitrogen dioxide together with an excess amount of oxygen. The term "containing an excess amount of oxygen" means that the oxygen content is larger than its stoichiometric amount relative to unburned components such as carbon monoxide, hydrogen, hydrocarbons in the exhaust gas. The term "nitrogen oxides" (NOx) means nitrogen monoxide and/or nitrogen dioxide.

The nitrogen oxides are one of causes of acid rain, posing a serious problem of environmental pollution. For these reasons, various methods have been proposed to remove nitrogen oxides from exhaust gases emitted from various combustion equipment.

In the case of large, stationary combustion apparatuses such as large combustion apparatuses of factories, ammonia is introduced into an exhaust gas, whereby nitrogen oxides in the exhaust gas are catalytically and selectively reduced (selective catalytic reduction).

However, such a method is disadvantageous, because ammonia is expensive, because ammonia is so toxic that the amount of ammonia should be controlled by measuring the concentration of nitrogen oxides in the exhaust gas, and because this reduction system generally needs large apparatuses.

There is an alternative method for reducing NOx, which comprises contacting an exhaust gas containing oxygen and NOx with a gaseous reducing agent such as hydrogen, carbon monoxide and hydrocarbons (non-selective catalytic reduction). However, this method requires a larger amount of the reducing agent than its stoichiometric amount relative to oxygen in the exhaust gas to carry out effective removal of NOx. Accordingly, this method is effective only for exhaust gas having a relatively low oxygen concentration, which is generated by burning nearly at a theoretical air-fuel ratio.

There have been proposed methods of reducing nitrogen oxides by adding to an exhaust gas a reducing agent in a smaller amount than a stoichiometric amount relative to oxygen in the exhaust gas, in the presence of a catalyst such as zeolite with or without carrying a transition metal (Japanese Patent Laid-Open Nos. 63-100919, 63-283727 and 1-130735). Further, Japanese Patent Laid-Open No. 4-354536 has disclosed a method in which nitrogen oxides are reduced on a catalyst comprising γ-alumina carrying alkaline earth metal and/or silver by adding to an exhaust gas a gaseous hydrocarbon.

However, these methods are effective only in a narrow temperature range. Also, their efficiency of removing nitrogen oxides is extremely low in the case of an actual exhaust gas because it contains about 10% of moisture and sulfur dioxide, and the temperature thereof largely depends on the operating condition.

OBJECT AND SUMMARY OF THE INVENTION

Accordingly, an object of the present invention is to provide an exhaust gas cleaner and a method capable of efficiently removing nitrogen oxides by reduction from an exhaust gas containing nitrogen oxides, sulfur oxides, moisture and oxygen in an amount larger than the stoichiometric amount relative to unburned components such as carbon monoxide, hydrogen, hydrocarbons, etc., which is discharged from stationary combustion apparatuses, gasoline engines operated under oxygen excess conditions, and diesel engines.

As a result of intense research in view of the above objects, the inventors have found that (1) when an exhaust gas, together with an externally added reducing agent such as hydrocarbons and oxygen-containing organic compounds, is brought into contact with a catalyst carrying an Ag component, nitrogen oxides are effectively reduced even in the presence of oxygen, moisture and sulfur dioxide accompanied by by-production of nitrogen-containing compounds such as alkyl nitrites, ammonia, etc. and aldehydes, (2) nitrogen oxides are effectively reduced in the presence of such nitrogen-containing compounds and aldehydes on a catalyst carrying an Ni component, a catalyst carrying two or more of Ag component, Cu component and Ni component, or a mixed catalyst of two or more of Ag catalyst, Cu catalyst and Ni catalyst, and (3) hydrocarbons, carbon monoxide and soluble organic fraction (SOF) are effectively oxidized on a catalyst carrying a noble metal with or without a base metal. Based on these findings, the inventors have further found that nitrogen oxides can be effectively removed even from an exhaust gas containing 10% moisture at a wide temperature range when the exhaust gas is, together with externally added reducing agent, brought into contact with an exhaust gas cleaner comprising a specific combination of the above catalysts. The present invention has been completed based on these findings.

Thus, in a first aspect of the present invention, there is provided an exhaust gas cleaner which comprises (1) a first catalyst comprising a first porous inorganic oxide supporting 0.2–15 weight % of at least one Ag component selected from the group consisting of Ag and Ag compounds; (2) a second catalyst comprising a second inorganic oxide supporting 1–30 weight % of an Ni component or 1–30 weight % of two or more of an Ag component, Cu component and Ni component, and optionally at least one component selected from the group consisting of 5 weight % or less of one or more of an alkali metal component and a rare earth component and 30 weight % or less of a base metal component, said Ni component being selected from the group consisting of Ni and Ni compounds, said Ag component being selected from the group consisting of Ag and Ag compounds, said Cu component being selected from the group consisting of Cu and Cu compounds, said alkali metal component being selected from the group consisting of alkali metal elements and oxides thereof, said rare earth component being selected from the group consisting of rare earth elements and oxides thereof, and said base metal component being selected from the group consisting of oxides of W, V, Mo, Mn, Nb and Ta; and optionally (3) a third catalyst comprising a third inorganic oxide supporting 0.01–5 weight % of a noble metal component alone or in combination with 0.2–10 weight % of a base metal component, said noble metal component being selected from the group consisting of Pt, Pd, Ru, Rh, Ir and Au, and said base metal component being selected from the group consisting of oxides of W, V, Mo, Mn, Nb and Ta. The first, second and third catalysts are disposed in this order from inlet side to outlet side of said exhaust gas cleaner. The second catalyst containing two or more of an Ag component, Cu component and Ni component may be physically mixed with the third catalyst to form a mixed catalyst.

In a second aspect of the present invention, there is provided an exhaust gas cleaner which comprises (1) a first catalyst comprising a first porous inorganic oxide supporting 0.2–15 weight % of at least one Ag component selected from the group consisting of Ag and Ag compounds; (2) a second catalyst comprising a second inorganic oxide supporting 0.5–30 weight % of an Ni component alone or in combination with 0.5–30 weight % of a Cu component, and optionally at least one component selected from the group consisting of 5 weight % or less of one or more of an alkali metal component and a rare earth component and 30 weight % or less of a base metal component, said Ni component being selected from the group consisting of Ni and Ni compounds, said Cu component being selected from the group consisting of Cu and Cu compounds, said alkali metal component being selected from the group consisting of alkali metal elements and oxides thereof, said rare earth component being selected from the group consisting of rare earth elements and oxides thereof, and said base metal component being selected from the group consisting of oxides of W, V, Mo, Mn, Nb and Ta; and optionally (3) a third catalyst comprising a third inorganic oxide supporting 0.01–5 weight % of a noble metal component alone or in combination with 0.2–10 weight % of a base metal component, said noble metal component being selected from the group consisting of Pt, Pd, Ru, Rh, Ir and Au, and said base metal component being selected from the group consisting of oxides of W, V, Mo, Mn, Nb and Ta. The first catalyst is physically mixed with the second catalyst to form a mixed catalyst.

In a third aspect of the present invention, there is provided an exhaust gas cleaner which comprises (1) a first catalyst comprising a first porous inorganic oxide supporting 0.2–15 weight % of at least one Ag component selected from the group consisting of Ag and Ag compounds; (2) a second catalyst which is a mixture of two or more of an Ni catalyst, a n Ag catalyst and a Cu catalyst, said Ni catalyst comprising a second porous inorganic oxide supporting 0.5–30 weight % of one or more of Ni and Ni compounds, said Ag catalyst comprising a second porous inorganic oxide supporting 0.5–15 weight % of one or more of Ag and Ag compounds, and said Cu catalyst comprising a second porous inorganic oxide supporting 0.5–15 weight % of one or more of Cu and Cu compounds and optionally at least one component selected from the group consisting of 5 weight % or less of one or more of alkali metal elements, rare earth elements and oxides thereof and 30 weight % or less of one or more of oxides of W, V, Mo, Mn, Nb and Ta, and optionally (3) a third catalyst comprising a third porous inorganic oxide supporting 0.01–5 weight % of a noble metal component alone or in combination with 0.2–10 weight % of a base metal component, said noble metal component being at least one selected from the group consisting of Pt, Pd, Ru, Rh, Ir and Au, and said base metal component being at least one selected from the group consisting of oxides of W, V, Mo, Mn, Nb and Ta. The second catalyst may be physically mixed with the third catalyst to form a mixed catalyst.

In a fourth aspect of the present invention, there is provided a method for removing nitrogen oxides by reduction from an exhaust gas containing nitrogen oxides and oxygen in an amount larger than its stoichiometric amount relative to unburned components in said exhaust gas, which comprises (1) disposing an exhaust gas cleaner as defined above in a flow path of the exhaust gas; (2) introducing into the exhaust gas at least one reducing agent selected from the group consisting of hydrocarbons and oxygen-containing organic compounds on an upstream side of the exhaust gas cleaner; and (3) bringing the resulting exhaust gas containing the reducing agent into contact with the exhaust gas cleaner at 150°–600° C., thereby causing a reaction of the nitrogen oxides with the reducing agent to remove the nitrogen oxides by reduction.

DETAILED DESCRIPTION OF THE PREFERRED EMBODIMENTS

The exhaust gas cleaner of the present invention may be basically in two forms.

The exhaust gas cleaner of a first preferred form is obtained by coating on a cleaner substrate at least one catalyst comprising a powdery porous inorganic oxide carrying one or more catalytically active components. The exhaust gas cleaner of such a form may be also obtained by depositing the catalytically active components onto a porous inorganic oxide powder coated on a cleaner substrate. Preferable materials for the cleaner substrate include porous, heat-resistant ceramics having a large specific surface area such as γ-alumina, titania, zirconia and their composite oxides such as γ-alumina-titania, γ-alumina-silica, γ-alumina-zirconia, titania-zirconia, etc. and oxide mixtures containing alumina. When a high heat resistance is required, cordierite, mullite, alumina or its composite oxides are preferable. Also, the cleaner substrate may be formed from a known metal material.

The shape and size of the cleaner substrate may be changed depending on applications. Practically, the cleaner substrate may be fabricated from two parts or more such as an inlet portion, an intermediate portion, an outlet portion, etc. The cleaner substrate may be of a three-dimensional structure such as a honeycomb, a foam, a refractory fiber assembly, etc. Further, the cleaner substrate may be of granules or pellets. Each of the catalysts may be coated on different portions of the same cleaner substrate, or each catalyst may be coated on separate cleaner substrates, and thereafter, fabricated into an exhaust gas cleaner. The catalyst may be coated onto the cleaner substrate by a wash-coating method, a powder method, etc. Alternatively, a cleaner substrate having a catalyst on its surface may be produced by supporting, by a known impregnation method, a precipitation method, an ion-exchanging method, etc., the active component on a porous inorganic oxide coated on the cleaner substrate by a wash-coating method, sol-gel method, etc.

The exhaust gas cleaner of a second preferred form may be produced by charging into a suitable reactor such as a catalytic converter, which is equipped with at least inlet and outlet portions, each of the catalysts obtained by carrying one or more catalytically active components on a pelletized, granular or powdery porous inorganic oxide, or obtained by forming a porous inorganic oxide carrying one or more catalytically active components into a pellet, granule or powder.

The preferred embodiments of the exhaust gas cleaner according to the present invention will be described in more detail. In the present description and claims, the weight percentage of the catalytically active component is expressed by metal basis and based on the amount of porous inorganic oxide on which the component concerned is carried.

[A] First Exhaust Gas Cleaner

The first preferred embodiment of the exhaust gas cleaner comprises (1) a first catalyst comprising a first porous inorganic oxide supporting an Ag component, (2) a second catalyst comprising a second porous inorganic oxide supporting an Ni component or two or more of Ag component, Cu component and Ni component, and optionally (3) a third catalyst comprising a third porous inorganic oxide supporting a noble metal component alone or in combination with a base metal component. The second catalyst may further support thereon at least one component selected from the group consisting of an alkali metal component, a rare earth component and a base metal component. The first, second and third catalyst are disposed in this order from the inlet side to the outlet side of the exhaust gas cleaner.

When the second catalyst is one carrying two or more of Ag component, Cu component and Ni component, the second catalyst may be physically mixed with the third catalyst to form a mixed catalyst. In this case, the first catalyst is disposed on the inlet side and the mixed catalyst of the second and third catalysts is disposed on the outlet side.

[A-1] First Catalyst

The first catalyst, which reduces nitrogen oxides over a wide temperature range, comprises a first porous inorganic oxide supporting at least one Ag component selected from the group consisting of Ag and Ag compounds.

The first porous inorganic oxide is at least one heat-resistant porous ceramic having a large specific surface area selected from the group consisting of alumina, titania, zeolite and composite oxides thereof, and preferably at least one of alumina and alumina-based composite oxides. Zeolite may include ferrierite, mordenite, ZSM-5, zeolite etc. Silica and titania may be contained in the composite oxides. Oxide mixtures of alumina containing titania, silica, zeolite, etc. may be preferably used. The alumina content in an alumina-based composite oxide or an oxide mixture containing alumina is preferably to be 50 weight % or more. The alumina-based composite oxide or the oxide mixture containing alumina improves durability and heat resistance of a catalyst even in the presence of sulfur dioxide in exhaust gas.

The specific surface area of the first porous inorganic oxide is preferably 10 m$^2$/g or more, and more preferably 30 m$^2$/g or more. When the specific surface area is smaller than 10 m$^2$/g, the Ag component is not dispersed sufficiently throughout the porous inorganic oxide, fails to remove nitrogen oxides efficiently.

The Ag component is at least one of Ag and Ag compounds which may include oxides of Ag, halides of Ag, sulfates of Ag and phosphates of Ag. Preferred Ag components are Ag, oxides of Ag, silver chloride and silver sulfate, and more preferred are Ag, oxides of Ag and silver chloride.

The amount (silver element basis) of the Ag component supported on the first porous inorganic oxide is 0.2–15 weight %, and preferably 0.5–12 weight %. When the amount is less than 0.2 weight % the removal ratio of the nitrogen oxides is low. On the other hand, the amount exceeding 15 weight % also decreases the NOx removal ratio because the reducing agent such as hydrocarbons and oxygen-containing organic compounds is likely to be predominantly burnt.

The Ag component may be carried on the first porous inorganic oxide by known methods such as an impregnation method, a precipitation method, etc. When zeolite is used, the active component may be carried thereon also by an ion-exchanging method.

Ag and/or Ag oxides may be carried by immersing the first porous inorganic oxide into an aqueous or ammoniacal aqueous solution of silver nitrate, silver acetate, etc., drying at about 50°–150° C., preferably a t about 70° C., and then subjecting the dried product to calcination by heating it stepwise from about 100° C. to about 600° C. in air, nitrogen gas stream containing oxygen or hydrogen gas stream. When the calcination is conducted in hydrogen gas stream, the calcined product is preferably subjected to oxidation treatment at 300°–650° C.

Silver sulfate may be deposited, for example, by immersing the first porous inorganic oxide in a solution of silver sulfate in aqueous nitric acid or by immersing the first porous inorganic oxide in a solution of ammonium sulfate after immersing in an aqueous solution of silver nitrate, and then followed by the same drying and calcination steps as described above.

Silver phosphate may be deposited, for example, by immersing the porous inorganic oxide in an aqueous solution of silver nitrate while adding little by little phosphoric acid or ammonium phosphate under stirring. The mixture is further stirred for 4 hours while shielding from light. After drying, the resulting porous inorganic oxide is calcined at 120° C. for one hour, 450° C. for 3 hours to obtain a porous inorganic oxide carrying silver phosphate, and finally calcined at 600° C. for 3 hours.

When silver halide is to be deposited, the porous inorganic oxide impregnated with an aqueous solution of silver nitrate, etc. is further immersed in an aqueous solution of ammonium halide to convert the silver nitrate into silver halide precipitation, and then followed by the same drying and calcination steps as described above.

It has been observed that the Ag component deposited on the porous inorganic oxide wets with the oxide to form a nearly circular aggregate upon the calcination in oxidative atmosphere. The average diameter, determined arithmetically, of the aggregate is 10–10000 nm, preferably 10–5000 nm, and more preferably 10–2000 nm. Generally the smaller the average diameter of the aggregate, the higher the activity of the Ag catalyst. However, when the average diameter is less than 10 nm, the reducing agent (hydrocarbons and/or oxygen-containing organic compounds) is likely to be predominantly oxidized, resulting in a decrease in the removal ratio of nitrogen oxides. On the other hand, when the average diameter is larger than 10000 nm, the catalytic activity of the Ag component becomes low, resulting in a low removal ratio of nitrogen oxides.

[A-2] Second Catalyst

The second catalyst comprises a second porous inorganic oxide supporting an Ni component or two or more of Ag component, Cu component and Ni component.

The second porous inorganic oxide is at least one heat-resistant porous ceramic having a large specific surface area selected from the group consisting of alumina, silica, titania, zirconia, zeolite and composite oxides thereof. The specific surface area is preferably 10 m$^2$/g, or more.

The Ni component is at least one of Ni and Ni compounds which may include oxides of Ni, halides of Ni and sulfates of Ni. The amount (nickel element basis) of the Ni component is 1–30 weight %, preferably 1–25 weight %.

Of the mixed component of Ag, Cu and Ni components, the Ag and Ni components are the same as described above. The Cu component is at o least one of Cu and Cu compounds which may include oxides of Cu, halides of Cu and sulfates of Cu. The amount (silver, copper and nickel elements basis) of two or more of the Ag, Cu and Ni components is 1–30 weight %, preferably 1–25 weight %. The weight ratio (element basis) of Ni:Ag, Ni:Cu and Ag:Cu are preferably 1:5 to 5:1.

The second catalyst may further carry the optional component selected from the group consisting of an alkali metal component, a rare earth component and a base metal component.

The alkali metal component is at least one of the alkali metal elements such as Na, K, etc. and oxides thereof. The rare earth component is at least one of the rare earth elements such as La, Ce, etc. and oxides thereof. The amount (alkali metal and rare earth element basis) of the total of the alkali metal component and the rare earth component is 5 weight % or less, preferably 4 weight % or less. These components improve the durability of the catalyst and increase the conversion of nitrogen oxides by the residual hydrocarbons.

The base metal component is at least one of the oxides of W, V, Mo, Mn, Nb and Ta. The amount (base metal element basis) is 30 weight % or less, preferably 24 weight % or less. The reduction of nitrogen oxides by ammonia produced on the first catalyst can be promoted by depositing this component.

The above components may be deposited on the second porous inorganic oxide by known methods such as an impregnation method, a precipitation method, etc. When zeolite is used, the active component may be deposited thereon also by an ion-exchanging method.

The Ag component is deposited by the same method as in the first catalyst.

The other components may be deposited basically in the same manner as in the preparation of the first catalyst. For example, a second porous inorganic oxide impregnated with one or more of the components is then subjected to the same drying and calcination steps as in the preparation of the first catalyst.

The Ni component may be deposited, for example, by immersing the second porous inorganic oxide in a solution containing the Ni component, such as aqueous solution of nickel nitrate, nickel sulfate, nickel chloride, etc.

The Cu component may be deposited, for example, by immersing the second porous inorganic oxide in a solution containing the Cu component, such as aqueous solution of copper sulfate, copper nitrate, copper acetate, copper chloride, etc.

The alkali metal component may be deposited, for example, by immersing the second porous inorganic oxide in an aqueous solution of nitrates, etc. of the alkali metal.

The rare earth component may be deposited, for example, by immersing the second porous inorganic oxide in a solution containing the rare earth component, such as aqueous solution of nitrate, etc. of rare earth element.

The base metal component may be deposited basically in the same manner as in the preparation of the first catalyst. For example, the second porous inorganic oxide carrying the Ni component, etc. is immersed in a solution containing the base metal component, such as aqueous solution of ammonium salt, etc. of W, V, Mo, Mn, Nb and Ta, and subjected to the same drying and calcination steps as in the preparation of the first catalyst, thereby carrying oxide of the above element.

Titania carrying the W component may be prepared by using metatitanic acid (hydrated titanium oxide) as the starting material in place of titania.

The weight ratio of the first catalyst and the second catalyst is 1:10 to 20:1, preferably 1:10 to 10:1, and more preferably 1:5 to 10:1.

[A-3] Third Catalyst

The optional third catalyst comprises a third porous inorganic oxide supporting a noble metal component alone or in combination with a base metal component, and may be mixed with the second catalyst carrying two or more of Ag component, Cu component and Ni component. The third catalyst is disposed at the outlet side of the exhaust gas cleaner and reduces NOx at a relatively low temperature and the oxidation of carbon monoxide, hydrocarbons and SOF. In particular, the third catalyst carrying both the noble metal component and base metal component can prevent the oxidation of sulfur dioxide.

The third porous inorganic oxide is at least one porous and heat-resistant ceramic selected from the group consisting of alumina, titania, zirconia, silica, zeolite and composite oxides thereof. The specific surface area is preferably 10 $m^2/g$ or more.

The noble metal component is one or more of Pt, Pd, Ru, Rh, Ir and Au, and one or more of Pt, Pd, Ru, Rh and Au is preferable. At least one of Pt, Pd and Au is more preferred. The amount (noble metal element basis) to be supported on the third porous inorganic oxide is 0.01–5 weight %, and preferably 0.01–4 weight %. The amount more than 5 weight % gives no additional improvement in the removal efficiency.

The base metal component is at least one of oxides of W, V, Mo, Mn, Nb and Ta. The amount (base metal element basis) to be supported is 0.2–10 weight %, preferably 0.2–9 weight %.

The noble metal component may be deposited onto the third porous inorganic oxide basically in the same manner as in the preparation of the first catalyst. For example, the third porous inorganic oxide is immersed in a solution containing the noble metal component, such as aqueous solution of chloroplatinic acid, chloroauric acid, palladium chloride, etc., and subjected to the same drying and calcination steps as in the preparation of the first catalyst. The Pt component may exist either in the form of element or oxide at working temperatures at which the cleaner is used.

The base metal component is deposited in the same manner as described in the second catalyst.

The weight ratio (element basis) of the first catalyst and the third catalyst is 1:5 to 20:1, preferably 1:4 to 10:1. When the ratio is less than 1:5 (excess of the third catalyst), a sufficiently high removal ratio of the nitrogen oxides cannot be achieved in a wide temperature range of 150°–600° C. On the other hand, when the ratio is higher than 20:1 (excess of the first catalyst), hydrocarbons, carbon monoxide and SOF remain not oxidized.

When the second catalyst carrying two or more of Ag component, Cu component and Ni component is mixed with the third catalyst, the weight ratio (element basis) of the second catalyst and the third catalyst is preferably 1:1 to 200:1, more preferably 1:1 to 100:1. When the ratio is less than 1:1 (excess of the third catalyst), a sufficiently high removal ratio of the nitrogen oxides cannot be achieved in a wide temperature range of 150°–600° C. On the other hand, when the ratio is higher than 20:1 (excess of the second catalyst), hydrocarbons, carbon monoxide and SOF remain not oxidized.

[B] Second Exhaust Gas Cleaner

The second preferred embodiment of the exhaust gas cleaner comprises (1) a mixed catalyst of a first catalyst comprising a first porous inorganic oxide supporting an Ag component and a second catalyst comprising a second porous inorganic oxide supporting an Ni component alone or in combination with a Cu component, and optionally (2) a third catalyst comprising a third porous inorganic oxide supporting a noble metal component alone or in combination with a base metal component. The second catalyst may further support thereon at least one component selected from the group consisting of an alkali metal component, a rare earth component and a base metal component. The mixed catalyst of the first and second catalyst is disposed on the inlet side, and the third catalyst on the outlet side of the exhaust gas cleaner.

[B-1] First Catalyst

The first catalyst of the second preferred embodiment, which comprises the first porous inorganic oxide carrying the 0.2–15 weight % of the Ag component, is the same as the first catalyst of the first preferred embodiment.

[B-2] Second Catalyst

The second catalyst comprises a second inorganic oxide supporting 0.5–30 weight %, preferably 1–25 weight % of an Ni component alone or in combination with 0.5–30 weight %, preferably 1–25 weight % of a Cu component.

The other features of the second catalyst are the same as described with respect to the second catalyst of the first preferred embodiment.

[B-3] Third Catalyst

The third catalyst is the same as the third catalyst of the first exhaust gas cleaner.

[C] Third Exhaust Gas Cleaner

The third preferred embodiment of the exhaust gas cleaner comprises (1) a first catalyst comprising a first porous inorganic oxide supporting an Ag component, (2) a second catalyst which is a mixture of two or more of an Ni catalyst comprising a second porous inorganic oxide supporting an Ni component, an Ag catalyst comprising a second porous inorganic oxide supporting an Ag component and a Cu catalyst comprising a second porous inorganic oxide supporting a Cu component and optionally at least one component selected from the group consisting of an alkali metal component, a rare earth component and a base metal component, and optionally (3) a third catalyst comprising a third porous inorganic oxide supporting a noble metal component alone or in combination with a base metal component. The first, second and third catalyst are disposed in this order from the inlet side to the outlet side of the exhaust gas cleaner. The second catalyst may be physically mixed with the third catalyst to form a mixed catalyst.

[C-1] First Catalyst

The first catalyst of the third preferred embodiment is the same as the first catalyst of the first preferred embodiment.

[C-2] Second Catalyst

The second catalyst of the third preferred embodiment is a mixture of two or more of an Ni catalyst comprising a second porous inorganic oxide supporting an Ni component, an Ag catalyst comprising a second porous inorganic oxide supporting an Ag component and a Cu catalyst comprising a second porous inorganic oxide supporting a Cu component.

The second porous inorganic oxide is the same as the second porous inorganic oxide of the first exhaust cleaner.

The Ni component is at least one component selected from the group consisting of Ni and Ni compounds which may include oxides of Ni, halides of Ni, sulfates of Ni, etc., and is supported in an amount (nickel element basis) of 0.5–30 weight %, preferably 0.5–25 weight %

The Ag component is at least one component selected from the group consisting of Ag and Ag compounds which may include oxides of Ag, halides of Ag, sulfates of Ag, phosphates of Ag, etc., and is supported in a n amount (silver element basis) of 0.5–15 weight %, preferably 1–12 weight %.

The Cu component is at least one component selected from the group consisting of Cu and Cu compounds which may include oxides of Cu, halides of Cu, sulfates of Cu, etc., and is supported in an amount (copper element basis) of 0.5–30 weight %, preferably 0.5–25 weight %. The Cu catalyst may further support the optional component selected from the group consisting of an alkali metal component, a rare earth component and a base metal component as in the case of the second catalyst of the first exhaust gas cleaner.

The above catalyst may be prepared in accordance with the methods for preparing the second catalyst of the first exhaust cleaner.

These catalysts are mixed so that the weight ratio (element basis) of the catalysts, i.e., Ni catalyst:Ag catalyst, Ni catalyst:Cu catalyst and Ag catalyst:Cu catalyst, may be 1:5 to 5:1. The weight ratio (element basis) of the first catalyst and the second catalyst is 1:10 to 20:1, preferably 1:5 to 10:1.

[C-3] Third Catalyst

The third catalyst is the same as the third catalyst of the first exhaust gas cleaner.

The weight ratio (element basis) of the first catalyst and the third catalyst is 1:5 to 20:1, preferably 1:4 to 10:1. When the ratio is less than 1:5 (excess of the third catalyst), a sufficiently high removal ratio of the nitrogen oxides cannot be achieved in a wide temperature range of 150°–600° C. On the other hand, when the ratio is higher than 20:1 (excess of the first catalyst), hydrocarbons, carbon monoxide and SOF remain not oxidized.

The second catalyst may be physically mixed with the third catalyst to form a mixed catalyst. In this case, the mixing ratio (element basis) of the second catalyst and the third catalyst is preferably 1:1 to 200:1, preferably 1:1 to 100:1 by weight. When the ratio is less than 1:1 (excess of the third catalyst), a sufficiently high removal ratio of the nitrogen oxides cannot be achieved over a wide temperature range of 150°–600° C. On the other hand, when the ratio is higher than 20:1 (excess of the second catalyst), hydrocarbons, carbon monoxide and SOF remain not oxidized.

Each of the catalysts described above may be coated onto a cleaner substrate as described above by known methods such as a wash-coating method, etc. The thickness of the Ag catalyst coated on the cleaner substrate is preferably up to 300 μm, though it is usually restricted by the difference in a thermal expansion coefficients between the catalyst and the cleaner substrate. With such thickness, it is possible to prevent the cleaner from being broken by a thermal shock, etc. during NOx-removing operations.

The amount of the respective catalyst coated onto a surface of the cleaner substrate is preferably 20–300 g/liter, more preferably 50–200 g/liter based on the cleaner substrate. When the amount is less than 20 g/liter, a sufficient removal ratio of the nitrogen oxides cannot be achieved. On the other hand, an amount more than 300 g/liter gives no additional increase in removal efficiency, but results in a higher loss of pressure.

[D] Method of Cleaning Exhaust Gas

With the exhaust gas cleaner described above, NOx can be effectively removed even from exhaust gas containing about 10% moisture over a wide temperature range of 150°–600° C.

[D-1] Reducing Agent

The exhaust gas usually contains residual hydrocarbons such as ethylene, propylene, etc. to some extent. Since the amount of residual hydrocarbons is not sufficient to reduce all nitrogen oxides in the exhaust gas, at least one reducing agent should be externally introduced into the exhaust gas. A site for introducing the reducing agent is an upstream side of the exhaust gas cleaner.

The reducing agent to be added to exhaust gas may include hydrocarbons and oxygen-containing organic compounds having at least two carbon atoms. The reducing agent may be added together with a fuel such as gasoline, diesel oil, kerosene, etc.

The hydrocarbons are alkanes, alkenes and alkynes which may be gaseous or liquid at the normal state (25° C., 1 atm). The alkanes and alkenes are preferably to have 2 or more carbon atoms. The liquid hydrocarbons may be diesel oil, cetane, heptane, kerosene, gasoline, etc., and those having a boiling point of 50°–350° C. are preferable.

The oxygen-containing organic compound having at least two carbon atoms may include alcohols having two or more of carbon atoms such as ethanol, isopropyl alcohol, etc.

The weight ratio (the reducing agent externally added with or without the above fuel/nitrogen oxides in exhaust gas) is preferably 0.1–5. When the weight ratio is less than 0.1, the removal ration of nitrogen oxides is not improved. On the other hand, when the weight ratio is more than 5, fuel efficiency is low.

[D-2] Apparent Space Velocity

To efficiently reduce nitrogen oxides with the oxygen-containing organic compounds, hydrocarbons, nitrous acid esters or ammonia, the apparent space velocity of the exhaust gas passing through each of the catalysts is preferably controlled.

On the first catalyst, the second catalyst and the mixed catalyst of the first and second catalysts, the apparent space velocity is 150,000 h$^{-1}$ or less, preferably 100,000 h$^{-1}$ or less, while 200,000 h$^{-1}$ or less, preferably 150,000 h$^{-}$ or less on the third catalyst and the mixed catalyst of the second and third catalysts.

[D-3] Exhaust Gas Temperature

The exhaust gas passing through the exhaust gas cleaner where the reducing agent is reacted with nitrogen oxides is kept at 150°–600° C; preferably 200°–550° C. and more preferably 300°–500° C. When the temperature is lower than 150° C., the reduction of nitrogen oxides by the reducing agent cannot be sufficiently deposited out. On the other hand, when the temperature is higher than 650° C., the reducing agent is burned before reacting with the nitrogen oxides, failing to reduce the nitrogen oxides effectively.

The present invention will be described in further detail by way of the following Examples. In the following Examples, the weight percentage of the catalytically active component is expressed by metal basis based on the porous inorganic oxide on which the component concerned is deposited.

EXAMPLE 1

A commercially available silica/alumina powder (silica content: 5 weight %, specific surface area: 350 m$^2$/g) was immersed in an aqueous solution of silver nitrate and then dried at 70° C. for 2 hours. The dried powder was heated to 600° C. stepwise and calcined there for 5 hours in air to prepare a first catalyst carrying 3.1 weight % of silver. The first catalyst (0.26 g) was coated on a commercially available honeycomb cordierite filter (diameter: 20 ram, length: 8.3 mm, 400 cells/in$^2$), dried and then heated to 600° C. stepwise to be calcined to prepare a first cleaner part (Ag).

A second cleaner part (Ni) coated with 0.26 g of a second catalyst carrying 10 weight % of nickel in the form of oxide was prepared in the same manner as above except for immersing a γ-alumina powder (specific surface area: 200 m$^2$/g) in an aqueous solution of nickel nitrate.

An exhaust gas cleaner consisting of the first cleaner part on the inlet side and the second cleaner part on the outlet side was disposed in a reactor tube. Next, a test gas having the composition shown in Table 1 was caused to pass through the reactor pipe at a flow rate of 3.48 liters per minute (the normal state: 25° C., 1 atm) while maintaining the test gas in the reactor tube at a temperature of 300°–600° C. to reduce nitrogen oxides with ethanol. The apparent space velocity on each of the first and second catalysts was about 80,000 h$^{-1}$.

In the present invention, the removal ratio was determined as follows. The concentration of nitrogen oxides in the effluent gas from the exhaust gas cleaner was measured by a chemiluminescence analyzer. The removal ratio was calculated according to the equation of $(NOx_{(in)} - NOx_{(out)})/NOx_{(in)} \times 100$. The results are shown in Table 2.

TABLE 1

| Component | Concentration |
|---|---|
| Nitrogen monoxide | 800 ppm |
| Oxygen | 10 volume % |
| Ethanol | 1560 ppm |
| Sulfur dioxide | 30 ppm |
| Nitrogen | Balance |
| Water | 10 volume % of the total volume of the above components |

EXAMPLE 2

A second cleaner part (Cu, Ni) coated with 0.26 g of a second catalyst carrying 10 weight % of copper in the form of oxide and 4.4 weight % of nickel in the form of oxide was prepared in the same manner as in Example 1 except for immersing γ-alumina powder (specific surface area: 200 m$^2$/g) in an aqueous solution of copper sulfate and nickel nitrate.

An exhaust gas cleaner consisting of the first cleaner part (Ag) of Example 1 on the inlet side and the second cleaner part (Cu, Ni) on the outlet side was disposed in a reactor tube. The results of the same test as in Example 1 are shown in Table 2.

EXAMPLE 3

A first cleaner part (Ag) coated with 0.26 g of a first catalyst carrying 3.0 weight % of silver was prepared in the same manner as in Example 1 except for using γ-alumina powder (specific surface area: 200 m$^2$/g).

Separately, after being immersed in an aqueous solution of copper nitrate, .γ-alumina powder (specific surface area: 200 m$^2$/g) was dried and calcined at 500° C. Further, silver was deposited on the γ-alumina powder thus obtained in the same manner as in Example 1 to prepare a second catalyst carrying 8 weight % of copper in the form of oxide and 1 weight % of silver. A second cleaner part (Ag, Cu) coated with 0.26 g of the second catalyst was prepared in the same manner as in Example 1.

An exhaust gas cleaner consisting of the first cleaner part (Ag) on the inlet side and the second cleaner part (Ag, Cu) on the outlet side was disposed in a reactor tube. The results of the same test as in Example 1 are shown in Table 2.

EXAMPLE 4

After being immersed for 20 minutes in an aqueous solution prepared by heating over a water bath a mixture of vanadium pentoxide, oxalic acid and water, titania powder (specific surface area: 35 m$^2$/g) was dried in air successively at 80° C., 100° C. and 120° C. each for 2 hours, and then heated from 120° C. to 500° C. over 5 hours and calcined there for 4 hours to carry 4.8 weight % of vanadium in the form of oxide. On the titania powder thus obtained, copper sulfate and nickel sulfate were further deposited in the same manner as in Example 1 while immersing for 20 minutes the titania powder in an aqueous solution of dissolving copper sulfate and nickel sulfate to prepare a second catalyst (Cu, Ni, V) supporting 4.8 weight % of vanadium in the form of oxide, 4.5 weight % of copper in the form of sulfate and 3.0 weight % of nickel in the form of sulfate. A second cleaner part (honeycomb cordierite filter, diameter: 20 mm, length: 13.2 mm, 400 cells/in$^2$) coated with 0.26 g the second catalyst was prepared in the same manner as in Example 1.

An exhaust gas cleaner consisting of the first cleaner part (Ag) of Example 3 on the inlet side and the second cleaner part (Cu, Ni, V) on the outlet side was disposed in a reactor tube. The results of the same test a s in Example 1 are shown in Table 2.

EXAMPLE 5

After immersing in an aqueous solution of copper acetate and silver acetate, zeolite powder (molar ratio (SiO$_2$/Al$_2$O$_3$):27, specific surface area: 230 m$^2$/g) was dried in air successively at 80° C., 100° C. and 120° C. each for 2 hours, then calcined while heating from 120° C. to 400° C. stepwise in a nitrogen stream containing 20% of oxygen to prepare a second catalyst (Cu, Ag) supporting 4.1 weight % of copper in the form of oxide and 1 weight % of silver. A second cleaner part coated with 0.26 g of the second catalyst was prepared in the same manner as in Example 1.

Next, after being immersed in an aqueous solution of chloroplatinic acid for 20 minutes, a titania powder (specific surface area: 35 m$^2$/g) was dried in air at 80° C. for 2 hours. The dried powder was calcined at 120° C. for 2 hours in nitrogen stream, and further calcined at 200°–400° C. for one hour while heated stepwise. The powder thus calcined was heated from 50° C. to 400° C. over 5 hours in nitrogen stream containing 4% hydrogen to be calcined there for 4 hours, and further heated from 50° C. to 500° C. over 5 hours in nitrogen stream containing 10% oxygen to be calcined there for 5 hours, thereby preparing a third catalyst (Pt) carrying 1 weight % of platinum. A third cleaner part coated with 0.26 g of the third catalyst was prepared in the same manner as in Example 1.

An exhaust gas cleaner consisting of the first cleaner part (Ag) of Example 3, the second cleaner part (Cu, Ag)and the third cleaner part (Pt) in this order from the inlet side to the outlet side was disposed in a reactor tube. The results of the same test as in Example 1 are shown in Table 2. The space velocity on each of the first, second and third catalyst was about 80,000 h$^{-1}$, respectively.

EXAMPLE 6

In the same manner as in Example 5, titania powder supporting 1 weight % of platinum was prepared. On the titania powder, oxide of vanadium was further deposited in the same manner as in Example 4 to prepare a third catalyst (V, Pt) carrying 3.3 weight % of vanadium in the form of oxide and 1 weight % of platinum. A third cleaner part coated with 0.26 g of the third catalyst was prepared in the same manner as in Example 1.

An exhaust gas cleaner consisting of the first cleaner part (Ag) of Example 1, the second cleaner part (Ni, Cu) of Example 2 and the third cleaner part (V, Pt) in this order from the inlet side to the outlet side was disposed in a reactor tube. The results of the same test as in Example 1 are shown in Table 2. The space velocity on each of the first, second and third catalyst was about 80,000 $^{-1}$, respectively.

Comparative Example 1

An exhaust cleaner consisting of a honeycomb cordierite filter (diameter: 20 mm, length: 8.3 mm, 400 cells/in$^2$) coated with 0.26 g of the first catalyst (Ag) of Example 3 was prepared in the same manner as in Example 1. The results of the same test as in Example 1 are shown in Table 2. The space velocity was about 80,000 h$^{-1}$.

TABLE 2

| | Removal Ratio of NOx | | | | | | |
|---|---|---|---|---|---|---|---|
| | Exhaust Gas Temperature (°C.) | | | | | | |
| | 300 | 350 | 400 | 450 | 500 | 550 | 600 |
| Examples | | | | | | | |
| 1 | 36.8 | 56.2 | 72.1 | 64.1 | 56.4 | 51.3 | 45.3 |
| 2 | 44.4 | 61.7 | 78.3 | 72.7 | 64.4 | 58.7 | 54.6 |
| 3 | 37.6 | 58.7 | 72.5 | 69.7 | 63.4 | 57.8 | 54.3 |
| 4 | 38.4 | 57.2 | 72.6 | 67.3 | 59.4 | 54.5 | 49.5 |
| 5 | 44.7 | 59.8 | 76.7 | 73.0 | 62.4 | 55.8 | 46.7 |
| 6 | 46.2 | 63.6 | 76.6 | 70.6 | 63.3 | 56.8 | 52.8 |
| Comparative Example | | | | | | | |
| 1 | 7.5 | 20.6 | 30.6 | 35.9 | 42.3 | 40.7 | 34.7 |

As seen from Table 2, as compared with Comparative Example 1 where only Ag catalyst was used, Examples 1–6 showed high removal efficiency of nitrogen oxides in a wide temperature range of exhaust gas.

EXAMPLE 7

A first cleaner part coated with 0.26 g of a first catalyst (Ag) supporting 3.1 weight % of silver was prepared in the same manner as in Example 1.

A second catalyst (Ni, Cu) supporting 4 weight % of nickel in the form of oxide and 10 weight % of copper in the form of oxide was prepared in the same manner as in Example 2.

Next, a third catalyst (Pt) supporting 1 weight % of platinum was prepared in the same manner as in Example 5.

A second cleaner part coated with a mixed catalyst of 0.26 g of the second catalyst and 0.0065 g of the third catalyst (mixing ratio: 40:1) was prepared in the same manner as in Example 1.

An exhaust gas cleaner consisting of the first cleaner part (Ag) on the inlet side and the second cleaner part (mixture of (Cu, Ni)and Pt) on the outlet side was disposed in a reactor tube. The results of the same test as in Example 1 are shown in Table 3 together with the results of Comparative Example 1. The space velocity on each of the first and mixed catalysts was about 80,000 h$^{-1}$.

EXAMPLE 8

A second catalyst (Ag, Cu) comprising zeolite powder (molar ratio (SiO$_2$/Al$_2$O$_3$):27, specific surface area: 230 m$_2$/g) supporting 1.0 weight % of silver and 4.1 weight % of copper was prepared in the same manner as in Example 5.

On the titania powder supporting 1.0 weight % of platinum prepared in the same manner as in Example 5, vanadium oxide was further deposited in the same manner as in Example 4 to prepare a third catalyst (V, Pt) carrying 1.0 weight % of platinum and 3.3 weight %of vanadium in the form of oxide.

A second cleaner part coated with a mixed catalyst of 0.26 g of the second catalyst and 0.0065 g of the third catalyst (mixing ratio: 40:1) was prepared in the same manner as in Example 1.

An exhaust gas cleaner consisting of the first cleaner part (Ag) of Example 7 on the inlet side and the second cleaner part (mixture of (Ag, Cu) and (V, Pt)) on the outlet side was disposed in a reactor tube. The results of the same test as in Example 1 are shown in Table 3. The space velocity on each of the first and mixed catalysts was about 80,000 h$^{-1}$.

EXAMPLE 9

A first cleaner part coated with 0.26 g of a first catalyst (Ag) comprising γ-alumina powder (specific surface area: 200 m$^2$/g) carrying 3.0 weight % of silver was prepared in the same manner as in Example 3.

A second catalyst (Ag, Ni) comprising silica/alumina powder (silica content: 5 weight %, specific surface area: 350 m$^2$/g) carrying 2.0 weight % of silver and 10 weight % of nickel in the form of oxide was prepared in the same manner as in Example 1 while using an aqueous solution of silver nitrate and nickel nitrate.

A second cleaner part coated with a mixed catalyst of 0.26 g of the second catalyst and 0.0065 g of the third catalyst of Example 7 (mixing ratio: 40:1) was prepared in the same manner as in Example 1.

An exhaust gas cleaner consisting of the first cleaner part (Ag) on the inlet side and the second cleaner part (mixture of (Ag, Ni)and Pt) on the outlet side was disposed in a reactor tube. The results of the same test as in Example 1 are shown in Table 3. The space velocity on each of the first and mixed catalysts was about 80,000 h$^{-1}$

TABLE 3

| | Removal Ratio of NOx | | | | | | |
|---|---|---|---|---|---|---|---|
| | Exhaust Gas Temperature (°C.) | | | | | | |
| | 300 | 350 | 400 | 450 | 500 | 550 | 600 |
| Examples | | | | | | | |
| 7 | 37.8 | 57.2 | 73.1 | 63.0 | 55.4 | 51.3 | 42.3 |
| 8 | 45.4 | 62.7 | 77.3 | 74.7 | 62.4 | 56.7 | 51.6 |
| 9 | 39.6 | 56.7 | 72.5 | 66.7 | 60.4 | 55.8 | 53.3 |
| Comparative Example | | | | | | | |
| 1 | 7.5 | 20.6 | 30.6 | 35.9 | 42.3 | 40.7 | 34.7 |

As seen from Table 3, as compared with Comparative Example 1 where only Ag catalyst was used, Examples 7–9 where the Ag catalyst and the mixed catalyst was combinedly used showed high removal efficiency of nitrogen oxides in a wide temperature range of exhaust gas.

EXAMPLE 10

A fist catalyst (Ag) comprising silica/alumina powder (silica content: 5 weight %, specific surface area: 350 m$^2$/g) carrying 3.1 weight % of silver was prepared in the same manner as in Example 1.

A second catalyst (Cu, Ni) comprising silica/alumina powder (silica content: 5 weight %, specific surface area: 350 m$^2$/g) carrying 4.4 weight % of copper in the form of oxide and 7 weight % of nickel in the form of oxide was prepared also in the same manner as in Example 1.

An exhaust gas cleaner consisting of a honeycomb cordierite filter (diameter: 20 mm, length: 13.2 mm, 400 cells/in$^2$) coated with a mixed catalyst of 0.2 g of the first catalyst and 0.06 g of the second catalyst was prepared in the same manner as in Example 1.

The exhaust gas cleaner was disposed in a reactor tube. The results of the same test as in Example 1 are shown in Table 4. The space velocity was about 50,000 h$^{-1}$.

EXAMPLE 11

A fist catalyst (Ag)comprising γ-alumina powder (specific surface area: 200 m$^2$/g) carrying 3.0 weight % of silver was prepared in the same manner as in Example 3.

A second catalyst (Ni, La, Cs) comprising γ-alumina powder (specific surface area: 200 m$^2$/g) carrying 7 weight % of nickel, 0.4 weight % of lanthanum and 0.4 weight % of cesium was prepared in the same manner as in Example 1 while using an aqueous solution of nickel nitrate, lanthanum nitrate and cesium nitrate.

An exhaust gas cleaner consisting of a honeycomb cordierite filter (diameter: 20 mm, length: 13.2 mm, 400 cells/in$^2$) coated with a mixed catalyst of 0.2 g of the first catalyst and 0.06 g of the second catalyst was prepared in the same manner as in Example 1.

The exhaust gas cleaner was disposed in a reactor tube. The results of the same test as in Example 1 are shown in Table 4. The space velocity was about 50,000 h$^{-1}$.

EXAMPLE 12

A second catalyst (V, Cu, Ni) comprising titania powder (specific surface area: 35 m$^2$/g) supporting 4.8 weight % of vanadium in the form of oxide, 4.5 weight % of copper in the form of sulfate and 2.5 weight % of nickel in the form of sulfate was prepared in the same manner as in Example 4.

An exhaust gas cleaner consisting of a honeycomb cordierite filter (diameter: 20 mm, length: 13.2 mm, 400 cells/in$^2$) coated with a mixed catalyst of 0.2 g of the first catalyst (Ag) of Example 11 and 0.06 g of the second catalyst was prepared in the same manner as in Example 1.

The exhaust gas cleaner was disposed in a reactor tube. The results of the same test as in Example 1 are shown in Table 4. The space velocity was about 50,000 h$^{-1}$.

EXAMPLE 13

A cleaner part consisting of a honeycomb cordierite filter (diameter: 20 mm, length: 6.6 mm, 400 cells/in$^2$) coated with 0.26 g of a catalyst (Pt) comprising titania powder (specific surface area: 35 m$^2$/g) carrying 1 weight % of platinum was prepared in the same manner as in Example 5.

An exhaust gas cleaner consisting of the cleaner (mixture of Ag and (Cu, Ni)) of Example 10 on the inlet side and the above cleaner part (Pt) on the outlet side was disposed in a reactor tube. The results of the same test as in Example 1 are shown in Table 4. The space velocity was about 50,000 h$^{-1}$ on the mixed catalyst and 100,000 h$^{-1}$ on the Pt catalyst.

EXAMPLE 14

In the same manner as in Example 5, titania powder (specific surface area: 35 m$^2$/g) supporting 1.0 weight % of platinum was prepared. On the titania powder, oxide of vanadium was further deposited in the same manner as in Example 4 to prepare a catalyst (V, Pt) carrying 3.3 weight % of vanadium in the form of oxide and 1.0 weight % of platinum. A cleaner part consisting of a honeycomb cordierite filter (diameter: 20 mm, length: 6.6 mm, 400 cells/in$^2$) coated with 0.26 g of the catalyst was prepared in the same manner as in Example 1.

An exhaust gas cleaner consisting of the cleaner (mixture of Ag and (Cu, Ni))of Example 10 on the inlet side and the above cleaner part (V, Pt) on the outlet side was disposed in a reactor tube. The results of the same test as in Example 1 are shown in Table 4. The space velocity was about 50,000 h$^{-1}$ on the mixed catalyst and 100,000 h$^{-1}$ on the V,Pt catalyst.

Comparative Example 2

An exhaust cleaner consisting of a honeycomb cordierite filter (diameter: 20 mm, length: 6.6 mm, 400 cells/in$^2$) coated with 0.26 g of the first catalyst (Ag) of Example 11 was prepared in the same manner as in Example 1. The results of the same test as in Example 1 are shown in Table 4. The space velocity was about 100.000 h$^{-1}$

TABLE 4

| | Removal Ratio of NOx | | | | | | |
|---|---|---|---|---|---|---|---|
| | Exhaust Gas Temperature (°C.) | | | | | | |
| | 300 | 350 | 400 | 450 | 500 | 550 | 600 |
| Examples | | | | | | | |
| 10 | 36.8 | 54.2 | 68.0 | 65.5 | 60.4 | 55.3 | 54.3 |
| 11 | 38.6 | 56.7 | 66.5 | 65.7 | 63.4 | 58.8 | 54.3 |
| 12 | 34.4 | 53.2 | 63.6 | 62.3 | 56.4 | 53.5 | 40.5 |
| 13 | 38.7 | 56.8 | 60.7 | 58.0 | 55.4 | 49.8 | 48.7 |
| 14 | 30.2 | 50.6 | 63.6 | 56.6 | 53.3 | 48.8 | 45.8 |
| Comparative Example | | | | | | | |
| 2 | 6.5 | 15.6 | 33.6 | 38.9 | 43.3 | 45.7 | 43.7 |

As seen from Table 4, as compared with Comparative Example 2 where only Ag catalyst was used, Examples 10–where the Ag catalyst and the catalyst carrying Ni or Ni+Cu were used together showed high removal efficiency of nitrogen oxides over a wide temperature range of exhaust gas.

EXAMPLE 15

A first cleaner part consisting of a honeycomb cordierite filter (diameter: 20 mm, length: 8.3 mm, 400 cells/in$^2$) coated with 0.26 g of a first catalyst (Ag) comprising silica/alumina powder (silica content: 5 weight %, specific surface area: 350 m$^2$/g) supporting 3.1 weight % of silver was prepared in the same manner as in Example 1.

An Ni catalyst comprising γ-alumina powder (specific surface area: 200 m$^2$/g) carrying 10 weight % of nickel in the form of oxide, and a Cu catalyst comprising γ-alumina powder (specific surface area: 200 m$^2$/g) carrying 10 weight % of copper in the form of oxide were prepared in the same manner as in Example 1 while using an aqueous solution of dissolving either nickel nitrate or copper sulfate.

A second cleaner part consisting of a honeycomb cordierite filter (diameter: 20 mm, length: 8.3 mm, 400 cells/in$^2$) coated with a mixed catalyst (second catalyst) containing 0.13 g of the Ni catalyst and 0.13 g of the Cu catalyst was prepared in the same manner as in Example 1.

An exhaust gas cleaner consisting of the first cleaner part (Ag) on the inlet side and the second cleaner part (mixture of Ni and Cu) on the outlet side was disposed in a reactor tube. The results of the same test as in Example 1 are shown in Table 5 together with the results of Comparative Example 1. The space velocity on each of the first and mixed catalysts was about 80.000 h$^{-1}$.

EXAMPLE 16

An Ag catalyst comprising γalumina powder (specific surface area: 200 m$^2$/g) carrying 4.0 weight % of silver was prepared in the same manner as in Example 3.

A second cleaner part consisting of a honeycomb cordierite filter (diameter: 20 mm, length: 8.3 mm, 400 cells/in$^2$) coated with a mixed catalyst (second catalyst) containing 0.13 g of the Ag catalyst and 0.13 g of the Cu catalyst of Example 15 was prepared in the same manner as in Example 1.

An exhaust gas cleaner consisting of the first cleaner part (Ag) of Example 15 on the inlet side and the second cleaner part (mixture of Ag and Cu) on the outlet side was disposed in a reactor tube. The results of the same test as in Example 1 are shown in Table 5. The space velocity on each of the first and mixed catalysts was about 80.000 h$^{-1}$.

EXAMPLE 17

A first cleaner part consisting of a honeycomb cordierite filter (diameter: 20 mm, length: 8.3 mm, 400 cells/in$^2$) coated with 0.26 g of a first catalyst (Ag) comprising γ-alumina powder (specific surface area: 200 m$^2$/g) supporting 3.0 weight % of silver was prepared in the same manner as in Example 1.

An Ag catalyst comprising silica/alumina powder (silica content: 5 weight %, specific surface area: 350 m$^2$/g) carrying 4.0 weight % of silver, and an Ni catalyst comprising silica/alumina powder (silica content: 5 weight %, specific surface area: 350 m$^2$/g) carrying 10 weight % of nickel in the form of oxide were prepared in the same manner as in Example 1 while using an aqueous solution dissolving of either silver nitrate or nickel sulfate.

A second cleaner part consisting of a honeycomb cordierite filter (diameter: 20 ram, length: 8.3 mm, 400 cells/in$^2$) coated with a mixed catalyst containing 0.13 g of the Ag catalyst and 0.13 g the Ni catalyst was prepared in the same manner as in Example 1.

An exhaust gas cleaner consisting of the first cleaner part (Ag) on the inlet side and the second cleaner part (mixture of Ag and Ni) on the outlet side was disposed in a reactor tube. The results of the same test as in Example 1 are shown in Table 5. The space velocity on each of the first and mixed catalysts was about 80.000 h$^{-1}$.

EXAMPLE 18

A Cu catalyst comprising zeolite powder (molar ratio (SiO$_2$/Al$_2$O$_3$): 27, specific surface area: 230 m$_2$/g) carrying 4.1 weight % of copper in the form of oxide was prepared in the same manner as in Example 5 while using an aqueous solution of copper acetate. In the same manner as above while using an aqueous solution of silver acetate, an Ag catalyst comprising the same type of zeolite powder carrying 1 weight % of silver was prepared.

A second cleaner part consisting of a honeycomb cordierite filter (diameter: 20 mm, length: 8.3 mm, 400 cells/in$^2$) coated with a mixed catalyst containing 0.13 g of the Ag catalyst and 0.13 g the Cu catalyst was prepared in the same manner as in Example 1.

Next, a third cleaner part consisting of a honeycomb cordierite filter (diameter: 20 mm, length: 8.3 mm, 400 cells/in$^2$) coated with 0.26 g of the third catalyst comprising titania powder (specific surface area: 35 m$^2$/g) carrying 1 weight % of platinum was prepared in the same manner as in Example 5.

An exhaust gas cleaner consisting of the first cleaner part (Ag) of Example 17, the second cleaner part (mixture of Ag and Cu) and the third cleaner part (Pt) in this order from the inlet side to the outlet side was disposed in a reactor tube. The results of the same test as in Example 1 are shown in Table 5. The space velocity on each of the first, second and third catalyst was about 80.000 h$^{-1}$, respectively.

EXAMPLE 19

In the same manner as in Example 5, titania powder (specific surface area: 35 m$^2$/g) supporting 1.0 weight % of platinum was prepared. On the titania powder, oxide of vanadium was further deposited in the same manner as in Example 4 to prepare a catalyst (V, Pt) carrying 3.3 weight % of vanadium in the form of oxide and 1.0 weight % of platinum. A cleaner part consisting of a honeycomb cordierite filter (diameter: 20 mm, length: 6.6 mm, 400 cells/in$^2$) coated with 0.26 g of the catalyst was prepared in the same manner as in Example 1.

An exhaust gas cleaner consisting of the first cleaner part (Ag) of Example 15, the second cleaner part (mixture of Ag and Cu) of Example 16 and the third cleaner part (V,Pt) in this order from the inlet side to the outlet side was disposed in a reactor tube. The results of the same test as in Example 1 are shown in Table 5. The space velocity on each of the first, second and third catalyst was about 80,000 h$^{-1}$, respectively.

TABLE 5

Removal Ratio of NOx

| | Exhaust Gas Temperature (°C.) | | | | | | |
|---|---|---|---|---|---|---|---|
| | 300 | 350 | 400 | 450 | 500 | 550 | 600 |
| Examples | | | | | | | |
| 15 | 38.8 | 59.2 | 75.1 | 64.0 | 54.4 | 51.3 | 45.3 |
| 16 | 43.4 | 61.7 | 79.3 | 74.7 | 64.4 | 58.7 | 54.6 |
| 17 | 39.6 | 59.7 | 75.5 | 70.7 | 63.4 | 57.8 | 54.3 |
| 18 | 44.7 | 58.8 | 74.7 | 73.0 | 65.4 | 56.8 | 48.7 |
| 19 | 43.2 | 63.6 | 77.6 | 73.6 | 63.3 | 56.8 | 52.8 |
| Comparative Example | | | | | | | |
| 1 | 7.5 | 20.6 | 30.6 | 35.9 | 42.3 | 40.7 | 34.7 |

As seen from Table 5, as compared with Comparative Example 1 where only Ag catalyst was used, Examples 15–19 where the Ag catalyst and the mixed catalyst were used together showed high removal efficiency of nitrogen oxides over a wide temperature range of exhaust gas.

EXAMPLE 20

A second cleaner part consisting of a honeycomb cordierite filter (diameter: 20 mm, length: 8.3 mm, 400 cells/in$^2$) coated with a mixed catalyst of 0.26 g of the second catalyst (mixture of Ni and Cu) of Example 15 and 0.0065 g of the third catalyst (Pt) of Example 18 (mixing ratio: 40:1) was prepared in the same manner as in Example 1.

An exhaust gas cleaner consisting of the first cleaner (Ag) of Example 15 on the inlet side and the second cleaner part (Ni, Cu, Pt) on the outlet side was disposed in a reactor tube. The results of the same test as in Example 1 are shown in Table 6 together with the results of Comparative Example 1. The space velocity was about 80,000 h$^{-1}$ on both the Ag catalyst and the mixed catalyst.

EXAMPLE 21

A second cleaner part consisting of a honeycomb cordierite filter (diameter: 20 mm, length: 8.3 mm, 400 cells/in$^2$) coated with a mixed catalyst of 0.26 g of the second catalyst (mixture of Ag and Cu) of Example 16 and 0.0065 g of the third catalyst (V, Pt) of Example 19 (mixing ratio: 40:1) was prepared in the same manner as in Example 1.

An exhaust gas cleaner consisting of the first cleaner (Ag) of Example 15 on the inlet side and the second cleaner part (Ag, Cu, V, Pt) on the outlet side was disposed in a reactor tube. The results of the same test as in Example 1 are shown in Table 6. The space velocity was about 80,000 h$^{-1}$ on both the Ag catalyst and the mixed catalyst.

EXAMPLE 22

A second cleaner part consisting of a honeycomb cordierite filter (diameter: 20 mm, length: 8.3 mm, 400 cells/in$^2$) coated with a mixed catalyst of 0.26 g of the second catalyst (mixture of Ag and Ni) of Example 17 and 0.0065 g of the third catalyst (Pt) of Example 18 (mixing ratio: 40:1) was prepared in the same manner as in Example 1.

An exhaust gas cleaner consisting of the first cleaner (Ag) of Example 17 on the inlet side and the second cleaner part (Ag, Ni, Pt) on the outlet side was disposed in a reactor tube. The results of the same test as in Example 1 are shown in Table 6. The space velocity was about 80,000 h$^{-1}$ on both the Ag catalyst and the mixed catalyst.

TABLE 6

Removal Ratio of NOx

| | Exhaust Gas Temperature (°C.) | | | | | | |
|---|---|---|---|---|---|---|---|
| | 300 | 350 | 400 | 450 | 500 | 550 | 600 |
| Examples | | | | | | | |
| 20 | 37.8 | 57.2 | 70.1 | 63.0 | 55.4 | 51.3 | 42.3 |
| 21 | 45.4 | 62.7 | 76.3 | 71.7 | 62.4 | 56.7 | 51.6 |
| 22 | 39.6 | 54.7 | 72.5 | 67.7 | 62.4 | 55.8 | 52.3 |
| Comparative Example | | | | | | | |
| 1 | 7.5 | 20.6 | 30.6 | 35.9 | 42.3 | 40.7 | 34.7 |

As seen from Table 6, as compared with Comparative Example 1 where only Ag catalyst was used, Examples 20–22 where the Ag catalyst and the mixed catalyst used together showed high removal efficiency of nitrogen oxides over a wide temperature range of exhaust gas.

What is claimed is:

1. An exhaust gas cleaner for removing nitrogen oxides by reduction from an exhaust gas containing nitrogen oxides and oxygen in an amount larger than its stoichiometric amount relative to unburned components in said exhaust gas, wherein said exhaust gas cleaner consists essentially of:

a first catalyst consisting essentially of a first porous inorganic oxide supporting a 0.2–15 weight % of at least one Ag component selected from the group consisting of Ag and Ag compounds; and a second catalyst consisting essentially of a second porous inorganic oxide supporting 1–30 weight % of two or more components selected from the group consisting of Ag components, Cu components, and Ni components in a weight ratio in terms of element basis of Ni:Ag=1:5 to 5:1, Ni:Cu=1:5 to 5:1, and Ag:Cu=1:5 to 5:1, said Ni components being at least one selected from the group consisting of Ni and Ni compounds, said Ag components being selected from the group consisting of Ag and Ag compounds, and said Cu components being selected from the group consisting of Cu and Cu compounds; the weight percentages being expressed by metal basis and being based on the amount of each porous inorganic oxide, and said first and second catalysts being disposed in this order from inlet side to outlet side of said exhaust gas cleaner for contact by said exhaust gas.

2. The exhaust gas cleaner according to claim 1, wherein a third catalyst consisting essentially of a third porous inorganic oxide supporting (a) 0.01–5 weight % of a noble metal component or (b) 0.01–5 weight % of a noble metal component and 0.2–10 weight % of a base metal component is disposed between said second catalyst and the outlet side of said exhaust gas cleaner, said noble metal component being at least one noble metal selected from the group consisting of Pt, Pd, Ru, Rh, Ir and Au, and said base metal component being at least one base metal selected from the group consisting of oxides of W, V, Mo, Mn, Nb and Ta.

3. The exhaust gas cleaner according to claim 1, wherein said second porous inorganic oxide further supports 30 weight % or less of a base metal component which is at least one base metal selected from the group consisting of oxides of W,V, Mo, Mn, Nb, and Ta.

4. The exhaust gas cleaner according to claim 3, wherein a third catalyst consisting essentially of a porous third inorganic oxide supporting (a) 0.01–5 weight % of a noble metal component or (b) 0.01–5 weight % of a noble metal component and 0.2–10 weight % of a base metal component is disposed between said second catalyst and the outlet side of said exhaust gas cleaner, said noble metal component being at least one noble metal selected from the the group consisting of Pt, Pd, Ru, Rh, Ir and Au, and said base metal component being at least one base metal selected from the group consisting of oxides of X, V, Mo, Mn, Nb and Ta.

5. An exhaust gas cleaner for removing nitrogen oxides by reduction from an exhaust gas containing nitrogen oxides and oxygen in an amount larger than its stoichiometric amount relative to unburned components in said exhaust gas, wherein said exhaust gas cleaner consists essentially of:

a first catalyst consisting essentially of a first porous inorganic oxide supporting 0.2–15 weight % of at least one Ag component selected from the group consisting of Ag and Ag compounds; and a mixed catalyst of a second catalyst consisting essentially of a second porous inorganic oxide supporting 1–30 weight % of two or more components selected from the group consisting of Ag components, Cu components, and Ni components in a weight ratio in terms of element basis of Ni:Ag=1:5 to 5:1, Ni:Cu=1:5 to 5:1 and Ag:Cu=1:5 to 5:1 and a third catalyst consisting essentially of a third porous inorganic oxide supporting (a) 0.01–5 weight % of a noble metal component or (b) 0.01–5 weight % of a noble metal component and 0.2–10 weight % of a base metal component, said Ni components being at least one selected from the group consisting of Ni and Ni compounds, said Ag components being at least one selected from the group consisting of Ag and Ag compounds said Cu components being at least one selected from the group consisting of Cu and Cu compounds, said noble metal component being at least one selected from the group consisting of Pt, Pd, Ru, Rh, Ir and Au, and said base metal component being at least one base metal selected from the group consisting of oxides of W, V, Mo, Mn, Nb and Ta; the weight percentages being expressed by metal basis and being based on the amount of each porous inorganic oxide, and said first and mixed catalysts being disposed in this order from inlet side to outlet side of said exhaust gas cleaner for contact by said exhaust gas.

6. The exhaust gas cleaner according to claim 5, wherein said second porous inorganic oxide further supports 5 weight % or less of at least one component selected from the group consisting of alkali metal elements and oxides thereof, and rare earth elements and oxides thereof.

7. The exhaust gas cleaner according to claim 5, wherein said second porous inorganic oxide further supports 30 weight % or less of a base metal component, said base metal component being at least one base metal selected from the group consisting of oxides of W, V, Mo, Mn, Nb and Ta.

8. The exhaust gas cleaner according to claim 6, wherein said second porous inorganic oxide further supports 30 weight % or less of a base metal component, said base metal component being at least one selected from the group consisting of oxides of W, V, Mo, Mn, Nb and Ta.

9. An exhaust gas cleaner for removing nitrogen oxides by reduction from an exhaust gas containing nitrogen oxides and oxygen in an amount larger than its stoichiometric amount relative to unburned components in said exhaust gas, wherein said exhaust gas cleaner consists essentially of:

a mixed catalyst of a first catalyst consisting essentially of a first porous inorganic oxide supporting 0.2–15 weight % of at least one Ag component selected from the group consisting of Ag and Ag compounds, and a second catalyst consisting essentially of a second porous inorganic oxide supporting (a) 0.5–30 weight % of an Ni component, or (b) 0.5–30 weight % of an Ni component and 0.5–30 weight % of a Cu component, a weight ratio of said Ni component and said Cu component being 1:5 to 5:1 in terms of element basis, said Ni component being at least one selected from the group consisting of Ni and Ni compounds, and said Cu component being at least one selected from the group consisting of Cu and Cu compounds; the weight percentages being expressed by metal basis and being based on the amount of each porous inorganic oxide.

10. The exhaust gas cleaner according to claim 9, wherein said second porous inorganic oxide further supports 5 weight % or less of at least one component selected from the group consisting of alkali metal elements and oxides thereof, and rare earth elements and oxides thereof.

11. The exhaust gas cleaner according to claim 9, wherein said second porous inorganic oxide further supports 30 weight % or less of a base metal component, said base metal component being at least one base metal selected from the group consisting of oxides of W, V, Mo, Mn, Nb and Ta.

12. The exhaust gas cleaner according to claim 10, wherein said second porous inorganic oxide further supports 30 weight % or less of a base metal component, said base metal component being at least one base metal selected from the group consisting of oxides of W, V, Mo, Mn, Nb and Ta.

13. The exhaust gas cleaner according to claim 9, wherein a third catalyst consisting essentially of a third porous inorganic oxide supporting (a) 0.01–5 weight % of a noble metal component or, (b) 0.01–5 weight % of a noble metal component and 0.2–10 weight % of a base metal component is disposed downstream of said second catalyst, said noble metal component being at least one noble metal selected from the group consisting of Pt, Pd, Ru, Rh, Ir and Au, and said base metal component being at least one base metal selected from the group consisting of oxides of W, V, Mo, Mn, Nb and Ta.

14. An exhaust gas cleaner for removing nitrogen oxides by reduction from an exhaust gas containing nitrogen oxides and oxygen in an amount larger than its stoichiometric amount relative to unburned components in said exhaust gas, wherein said exhaust gas cleaner consists essentially of:

a first catalyst consisting essentially of a first porous inorganic oxide supporting 0.2–15 weight % of at least one Ag component selected from the group consisting of Ag and Ag compounds;

a second catalyst which is a mixture of two or more of an Ni catalyst, an Ag catalyst and a Cu catalyst in a weight ratio in terms of element basis of Ni:Ag=1:5 to 5:1, Ni:Cu=1:5 to 5:1 and Ag:Cu=1:5 to 5:1, said Ni catalyst consisting essentially of a second porous inorganic oxide supporting 0.5–30 weight % of one or more of Ni and Ni compounds, said Ag catalyst consisting essentially of a third porous inorganic oxide supporting 0.5–15 weight % of one or more of Ag and Ag compounds, and said Cu catalyst consisting essentially of a fourth porous inorganic oxide supporting 0.5–15 weight % of one or more of Cu and Cu compounds; the weight percentages being expressed by metal basis and being based on the amount of each porous inorganic oxide, and said first and second catalysts being disposed in this order from inlet side to outlet side of said exhaust gas cleaner for contact by said exhaust gas.

15. The exhaust gas cleaner according to claim 14, wherein said fourth porous inorganic oxide further supports 5 weight % or less of at least one component selected from the group consisting of alkali metal metals and oxides thereof, and rare earth elements and oxides thereof.

16. The exhaust gas cleaner according to claim 14 wherein said fourth porous inorganic oxide further supports 30 weight % or less of a base metal component, said base metal component being at least one base metal selected from the group consisting of oxides of W, V, Mo, Mn, Nb and Ta.

17. The exhaust gas cleaner according to claim 15, wherein said fourth porous inorganic oxide further supports 30 weight % or less of a base metal component, said base metal component being at least one base metal selected from the group consisting of oxides of W, V, Mo, Mn, Nb and Ta.

18. The exhaust gas cleaner according to claim 14, wherein a third catalyst consisting essentially of a fifth porous inorganic oxide supporting (a) 0.01–5 weight % of a noble metal component or (b) 0.01–5 weight % of a noble metal component and 0.2–10 weight % of a base metal component is disposed between said second catalyst and the outlet side of said exhaust gas cleaner, said noble metal component being at least one noble metal selected from the group consisting of Pt, Pd, Ru, Rh, Ir and Au, and said base metal component being at least one base metal selected from the group consisting of oxides of W, V, Mo, Mn, Nb and Ta.

19. The exhaust gas cleaner according to claim 18, wherein said fourth porous inorganic oxide further supports 5 weight % or less of at least one component selected from the group consisting of alkali metal elements and oxides thereof, and rare earth elements and oxides thereof.

20. The exhaust gas cleaner according to claim 18, wherein said fourth porous inorganic oxide further supports 30 weight % or less of a base metal component, said base metal component being at least one base metal selected from the group consisting of oxides of W, V, Mo, Mn, Nb and Ta.

21. The exhaust gas cleaner according to claim 19, wherein said fourth porous inorganic oxide further supports 30 weight % or less of a base metal component, said base metal component being at least one base metal selected from the group consisting of oxides of W, V, Mo, Mn, Nb and Ta.

22. The exhaust gas cleaner according to claim 18, wherein said second catalyst and third catalyst are physically mixed to form a mixed catalyst.

23. The exhaust gas cleaner according to claim 19, wherein said second catalyst and third catalyst are physically mixed to form a mixed catalyst.

24. The exhaust gas cleaner according to claim 20, wherein said second catalyst and third catalyst are physically mixed to form a mixed catalyst.

25. The exhaust gas cleaner according to claim 21, wherein said second catalyst and third catalyst are physically mixed to form a mixed catalyst.

26. The exhaust gas cleaner according to claim 1, wherein said Ag compound is selected from the group consisting of oxides of silver, halides of silver, sulfates of silver and phosphates of silver said Ni compound is selected from the group consisting of oxides of nickel, halides of nickel and sulfates of nickel, and said Cu compound is selected from the group consisting of oxides of copper, halides of copper and sulfates of copper.

27. The exhaust gas cleaner according to claim 5, wherein said Ag compound is selected from the group consisting of oxides of silver, halides of silver, sulfates of silver and phosphates of silver, said Ni compound is selected from the group consisting of oxides of nickel, halides of nickel and sulfates of nickel, and said Cu compound is selected from the group consisting of oxides of copper, halides of copper and sulfates of copper.

28. The exhaust gas cleaner according to claim 9, wherein said Ag compound is selected from the group consisting of oxides of silver, halides of silver and phosphates of silver, said Ni compound is selected from the group consisting of oxides of nickel, halides of nickel and sulfates of nickel and said Cu compound is selected from the group consisting of oxides of copper, halides of copper and sulfates of copper.

29. The exhaust gas cleaner according to claim 14, wherein said Ag compound is selected from the group consisting of oxides of silver, halides of silver, sulfates of silver and phosphates of silver, said Ni compound is selected from he group consisting of oxides of nickel, halides of nickel and sulfates of nickel, and said Cu compound is selected from the group consisting of oxides of copper, halides of copper and sulfates of copper.

30. The exhaust gas cleaner according to claim 1, wherein said first porous inorganic oxide is at least one porous inorganic oxide selected from the group consisting of alumina, titania, zeolite and composite oxides containing one or more of alumina, titania and zeolite, and said second porous inorganic oxide is at least one porous inorganic oxide selected from the group consisting of alumina, titania, zeolite, silica, zirconia and composite oxides thereof.

31. The exhaust gas cleaner according to claim 2, wherein said third porous inorganic oxide is at least one porous inorganic oxide selected from the group consisting of alumina, titania, zeolite, silicas zirconia and composite oxides thereof.

32. The exhaust gas cleaner according to claim 4, wherein said third porous inorganic oxide is at least one porous inorganic oxide selected from the group consisting of alumina, titania, zeolite, silica, zirconia and composite oxides thereof.

33. The exhaust gas cleaner according to claim 5, wherein said first porous inorganic oxide is at least one porous inorganic oxide selected from the group consisting of alumina, titania, zeolite and composite oxides containing one or more of alumina, titania and zeolite, said second porous inorganic oxide is at least one porous inorganic oxide selected from the group consisting of alumina, titania, zeolite, silica, zirconia and, composite oxides thereof, and said third porous inorganic oxide is at least one porous inorganic oxide selected from the group consisting of alumina, titania, zeolite, silica, zirconia and composite oxides thereof.

34. The exhaust gas cleaner according to claim 9, wherein said first porous inorganic oxide is at least one porous inorganic oxide selected from the group consisting of alumina, titania, zeolite and composite oxides containing one or more of alumina, titania and zeolite, and said second porous inorganic oxide is at least one porous inorganic oxide selected from the group consisting of alumina, titania, zeolite, silica, zirconia and composite oxides thereof.

35. The exhaust gas cleaner according to claim 13, wherein said third porous inorganic oxide is at least one porous inorganic oxide selected from the group consisting of alumina, titania, zeolite, silica, zirconia and composite oxides thereof.

36. The exhaust gas cleaner according to claim 14, wherein said first porous inorganic oxide is at least one porous inorganic oxide selected from the group consisting of alumina, titania, zeolite and composite oxides containing one or more alumina, titania, zeolite, and each of said second, third, and fourth porous inorganic oxides is at least one porous inorganic oxide selected from the group consisting of alumina, titania, zeolite, silica, zirconia and composite oxides thereof.

37. The exhaust gas cleaner according to claim 18, wherein said fifth porous inorganic oxide is at least one porous inorganic oxide selected from the group consisting of alumina, titania, zeolite, silica, zirconia and composite oxides thereof.

38. A method for removing nitrogen oxides by reduction from an exhaust gas containing nitrogen oxides and oxygen in an amount larger than its stoichiometric amount relative to unburned components in said exhaust gas, which comprises:

disposing an exhaust gas cleaner in a flow path of said exhaust gas;

introducing into said exhaust gas at least one reducing agent selected from the group consisting of hydrocarbons and oxygen-containing organic compounds on an upstream side of said exhaust gas cleaner; and bringing the resulting exhaust gas containing said reducing agent into contact with said exhaust gas cleaner at 150–600 C., thereby reducing said nitrogen oxides with said reducing agent to remove said nitrogen oxides by reduction; said exhaust gas cleaner consisting essentially of:

a first catalyst consisting essentially of a first inorganic oxide supporting 0.2–15 weight % of at least one Ag component selected from the group consisting of Ag and A compounds; and a second catalyst consisting essentially of a second porous inorganic oxide supporting (a) 1–30 weight % of an Ni component or (b) 1–30 weight % of two or more of an Ag component, Cu component and Ni component in a weight ratio in terms of element basis of Ni:Ag=1:5 to 5:1, Ni:Cu=1:5 to 5:1 and Ag:Cu=1:5 to 5:1, said Ni component being at least one selected from the group consisting of Ni and Ni compounds, said Ag component being selected from the group consisting of Ag and Ag compounds, and said Cu component being selected from the group consisting of Cu and Cu compounds; the weight percentages being expressed by metal basis and being based on the amount of each porous inorganic oxide, and said first and second catalysts being disposed in this order from inlet side to outlet side of said exhaust gas cleaner for contact by said exhaust gas.

39. A method for removing nitrogen oxides by reduction from an exhaust gas containing nitrogen oxides and oxygen in an amount larger than its stoichiometric amount relative to unburned components in said exhaust gas, which comprises:

disposing an exhaust gas cleaner into a flow path of said exhaust gas;

introducing into said exhaust gas at least one reducing agent selected from the group consisting of hydrocarbons and oxygen-containing organic compounds on an upstream side of said exhaust gas cleaner; and bringing the resulting exhaust gas containing said reducing agent into contact with said exhaust gas cleaner at 150–600 C., thereby reducing said nitrogen oxides with said reducing agent to remove said nitrogen oxides by reduction; said exhaust gas cleaner consisting essentially of:

a first catalyst consisting essentially of a first porous inorganic oxide supporting 0.2–15 weight % of at least one Ag component selected from the group consisting of Ag and Ag compounds; and a mixed catalyst of a second catalyst consisting essentially of a second porous inorganic oxide supporting 1–30 weight % of two or more of an Ag component, Cu component and Ni component in a weight ratio in terms of element basis of Ni:Ag=1:5 to 5:1, Ni:Cu=1:5 to 5:1 and Ag:Cu=1:5 to 5:1 and a third catalyst consisting essentially of a third porous inorganic oxide supporting (a) 0.01–5 weight % of a noble metal component or (b) 0.01–5 weight % of a noble metal component and 0.2–10 weight % of a base metal component, said Ni component being at least one selected from the group consisting of Ni and Ni compounds, sad Ag component being at least one selected from the group consisting of Ag and Ag compounds, said Cu component being at least one selected from the group consisting of Cu and Cu compounds, said noble metal component being at least one noble metal selected from the group consisting of Pt, Pd, Ru, Rh, Ir and Au, and said base metal component being at least one base metal selected from the group consisting of oxides of W, V, Mo, Mn, Nb and Ta;

the weight percentages being expressed by metal basis and being based on the amount of each porous inorganic oxide, and said first and mixed catalysts being disposed in this order from inlet side to outlet side of said exhaust gas cleaner for contact by said exhaust gas.

40. A method for removing nitrogen oxides by reduction from an exhaust gas containing nitrogen oxides and oxygen in an amount larger than its stoichiometric amount relative to unburned components in said exhaust gas, which comprises:

disposing an exhaust gas cleaner in a flow path of said exhaust gas;

introducing into said exhaust gas at least one reducing agent selected from the group consisting of hydrocarbons and oxygen-containing organic compounds on an upstream side of said exhaust gas cleaner; and bringing the resulting exhaust gas containing said reducing agent into contact with said exhaust gas cleaner at 150–600 C., thereby reducing said nitrogen oxides with said reducing agent to remove said nitrogen oxides by reduction; said exhaust gas cleaner consisting essentially of:

a mixed catalyst of a first catalyst consisting essentially of a first porous inorganic oxide supporting 0.2–15 weight % of at least on Ag component selected from the group consisting of Ag and Ag compounds, and a second catalyst consisting essentially of a second porous inorganic oxide supporting (a) 0.5–30 weight % of an Ni component, or (b) 0.5–30 weight % of an Ni component and 0.5–30 weight % of a Cu component, a weight ratio of said Ni component and said Cu component being 1:5 to 5:1 in terms of element basis, said Ni component being at least one selected from the group consisting of Ni and Ni compounds, and said Cu component being at least one selected from the group consisting of Cu and Cu compounds;

the weight percentages being expressed by metal basis and being based on the amount of each porous inorganic oxide.

41. A method for removing nitrogen oxides by reduction from an exhaust gas containing nitrogen oxides and oxygen in an amount larger than its stoichiometric amount relative to unburned components in said exhaust gas, which comprises:

disposing an exhaust gas cleaner in a flow path of said exhaust gas;

introducing into said exhaust gas at least one reducing agent selected from the group consisting of hydrocarbons and oxygen-containing organic compounds on an upstream side of said exhaust gas cleaner; and bringing the resulting exhaust gas containing said reducing agent into contact with said exhaust gas cleaner at 150–600 C., thereby reducing said nitrogen oxides with said reducing agent to remove said nitrogen oxides by reduction; said exhaust gas cleaner consisting essentially of:

a first catalyst consisting essentially of a first porous inorganic oxide supporting 0.2–15 weight % of at least one Ag component selected form the group consisting of compounds;

a second catalyst which is a mixture of two or more of an Ni catalyst, an Ag catalyst and a Cu catalyst in a weight ratio in terms of element basis of Ni:Ag=1:5 to 5:1, Ni:Cu=1:5 to 5:1 and Ag:Cu=1:5 to 5:1, said Ni catalyst consisting essentially of a second porous inorganic oxide supporting 0.5–30 weight % of one or more of Ni and Ni compounds, said Ag catalyst consisting essentially of a third porous inorganic oxide supporting 0.5–15 weight % of one or more of Ag and Ag compounds, and said Cu catalyst consisting essentially of a fourth porous inorganic oxide supporting 0.5–15 weight % of one or more of Cu and Cu compounds; the weight percentages being expressed by metal basis and being based on the amount of each porous inorganic oxide, and said first and second catalysts being disposed in this order from inlet side to outlet side of said exhaust gas cleaner for contact by said exhaust gas.

\* \* \* \* \*